No. 738,204. PATENTED SEPT. 8, 1903.
A. KITSON.
TABLE LAMP.
APPLICATION FILED JULY 12, 1900.
NO MODEL.
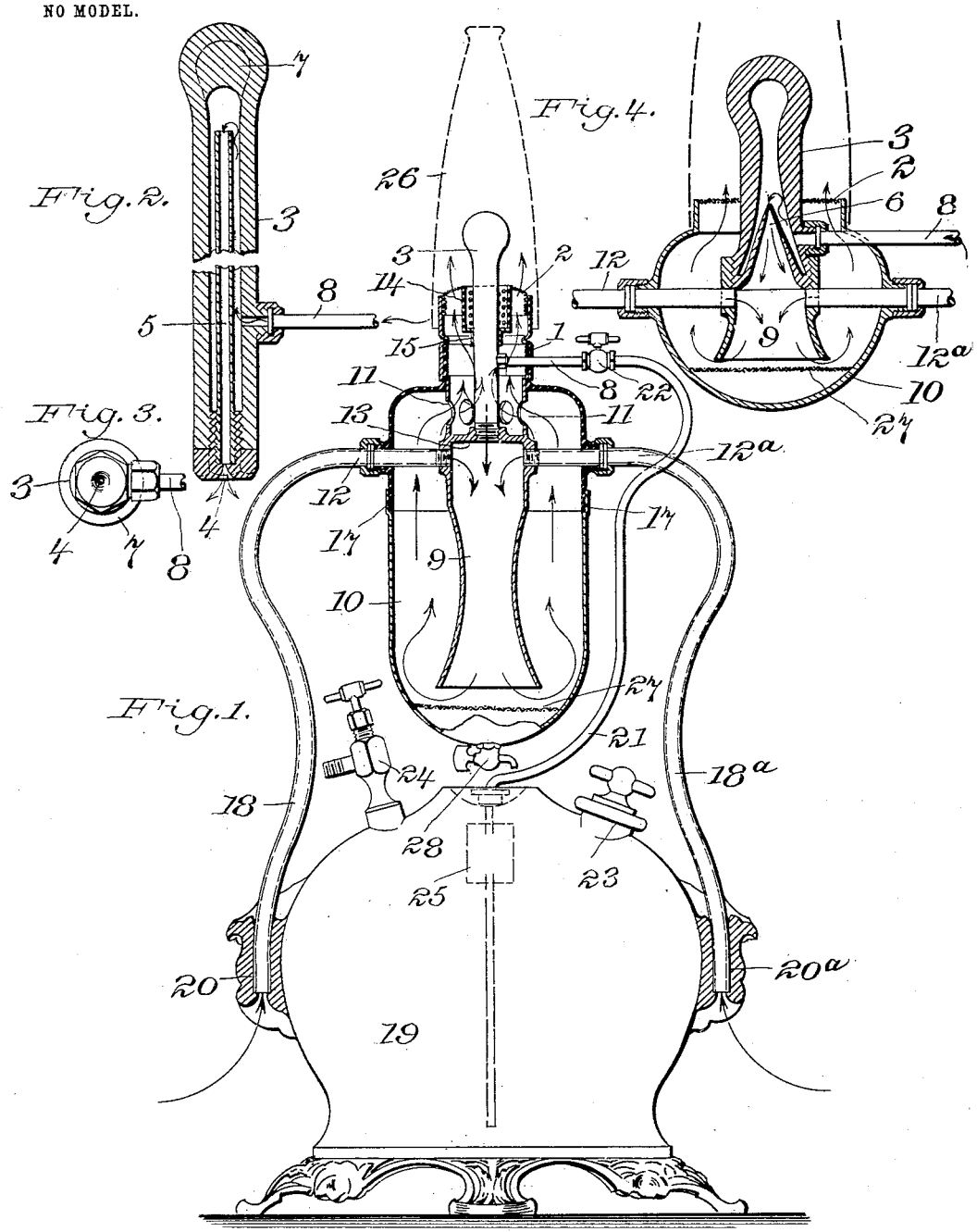
WITNESSES:
L E Pearson
W. H. Pumphrey
INVENTOR
Arthur Kitson
BY
ATTORNEY No. 738,204.　　　　　　　　　　　　　　　　　　　Patented September 8, 1903.

UNITED STATES PATENT OFFICE.

ARTHUR KITSON, OF PHILADELPHIA, PENNSYLVANIA.

TABLE-LAMP.

SPECIFICATION forming part of Letters Patent No. 738,204, dated September 8, 1903.

Application filed July 12, 1900. Serial No. 23,341. (No model.)

*To all whom it may concern:*

Be it known that I, ARTHUR KITSON, a citizen of the United States of America, and a resident of Philadelphia, county of Philadelphia, State of Pennsylvania, have invented certain new and useful Improvements in Table-Lamps, of which the following is a specification.

My invention relates to vapor-burning lamps operating under pressure and employing an incandescent mantle, and is more specifically designed to produce an improved form of table-lamp which shall be compact and in which the vapor forming and burning apparatus shall be practically separate from the reservoir containing the oil or other hydrocarbon and capable of easy disconnection therefrom and so constructed that little or no heat will be conducted from the burner to the reservoir.

My invention contains further points of advantage which will be more specifically described in the specification thereof.

A preferred form of apparatus, with certain modifications embodying my invention, is illustrated in the accompanying sheet of drawings, in which—

Figure 1 is a side elevation and partial section of a lamp constructed in accordance with my invention. Fig. 2 is an enlarged sectional detail of one form of vaporizing-tube. Fig. 3 is a bottom view thereof, showing the discharge-orifice. Fig. 4 is a vertical central section of a modification.

Throughout the drawings like reference-figures indicate like parts.

The vapor-burner consists, preferably, of a vertical cylinder 1, (which I will call the "vapor-burner tube,") having an annular perforated diaphragm 2 across its upper end. This perforated diaphragm may be made of wire-gauze, as shown. A vertical vaporizing-tube 3 passes through this upper perforated diaphragm and has its upper end closed, as shown, while a discharge-nozzle, such as is shown at 4, is attached to or formed on its lower end. This nozzle has an extension which may be in the form of an inner tube 5, extending up into the interior of the vaporizing-tube, as shown in Fig. 2, or it may be an inwardly-extending cone 6 or other form of lip, as shown in Fig. 4. The upper end of the vaporizing-tube—that is to say, the closed end—is preferably made solid, as shown at 7 in Fig. 2, or it may be hollowed out, as shown by dotted lines in Fig. 2 and full lines in Fig. 4.

An inlet-tube 8 is connected to the vaporizing tube and preferably discharges into the trap 16, formed in the lower portion of the vaporizing-tube by the extension of the discharge-nozzle.

A mixing-tube 9 is located below the vapor-burner tube and preferably in line therewith and attached thereto, as shown in Fig. 1, or attached to the vaporizing-tube, as shown in Fig. 4. This mixing-tube and the lower portion of the vaporizing-tube are preferably inclosed in a mixing-chamber 10, which is closed at the lower end and extends up to and connects with the middle or lower portion of the vapor-burner tube. In the construction shown in Fig. 1, where the mixing-tube 9 is connected to the vapor-burner tube 1, there are inlet-holes 11 11, formed in the lower portion of the vapor-burner tube, and below these air and vapor inlets 11 is located a diaphragm 13, through which the vaporizing-tube also extends. In the construction shown in Fig. 4 the mixing-tube not being connected directly to the vapor-burner tube the annular space between the mixing-tube and the vapor-burner tube takes the place of the air and vapor inlets 11. Air-inlet tubes 12 $12^a$ extend through the walls of the mixing-chamber 10 and through the mixing-tube 9, conducting air to the interior of said mixing-tube. These mixing-tubes are preferably bent so as to form downward extensions 18 $18^a$, which serve as supports for the entire vapor generating, mixing, and burning apparatus before described. Preferably the bowl or oil-reservoir 19 has recesses 20 $20^a$ formed on its exterior, with which the downward extensions of the air-tubes 18 $18^a$ engage, so that the other portions of the lamp are supported from said oil-reservoir by means of the air-inlet tubes, as shown in Fig. 1.

While the burner may have a plain annular gauze surrounding the vaporizing-tube, as shown in Fig. 4, I prefer to have a perforated cylinder 14, supported in the central opening of said burner diaphragm or gauze and then to provide the vaporizing-tube with a collar 15, which abuts against the lower end of said perforated cylinder, as shown in Fig. 1.

The containing walls of the mixing-chamber 10 may be formed in two parts connected by a screw-joint, as shown at 17.

A fine flexible tube 21 extends from the interior of the oil tank or reservoir to the inlet-tube 8, its connection therewith being controlled by a valve 22. The oil-reservoir may be provided with an opening 23, provided with a screw-plug for purposes of filling, and a valve-controlled connection 24 for introducing the compressed air into the interior of the reservoir. The oil-tube 21 may also be provided with the usual strainer or filter, as indicated at 25.

The burner is preferably surmounted with the usual form of incandescent mantle, as indicated at 26. Preferably a gauze is placed across the bottom of the mixing-chamber, as indicated at 27, in order to thoroughly intermingle the currents of vapor and air and also to catch any unvaporized particles of oil and assist in their vaporization by subjecting them to the action of the air-currents. A drip-cock 28 may be placed at the lowest point of the mixing-chamber.

The mode of operation of my invention is as follows: The vaporizing-tube 3 being heated by means of a torch or any other of the well-known ways and compressed air having been introduced into the oil-reservoir 19, the valve 22 is opened and a small amount of oil is admitted to the vaporizing-tube. The heat of said vaporizing-tube will vaporize said oil and the vapor will pass down through the extension 5 or 6 of the discharge-nozzle and issue from said discharge-nozzle in the shape of a jet of vapor discharged downwardly into the mixing-tube 9. This will draw in air through the air-inlet tubes 12 12$^a$ and the mixture of vapor and air will pass down to the lower portion of the mixing-chamber 10, where the current will be reversed and the mixture pass up, as indicated by the arrows, through the inlets 11 or their equivalent openings (shown in Fig. 4) to the perforated diaphragm 2. After passing through said diaphragm the mixture is ignited and a blue flame thus formed heats the mantle 26 to incandescence, giving off light. The upper end of the vaporizing-tube 3, being in the center of this intensely-hot flame, receives sufficient heat to continue the vaporization of the oil and the action of the lamp becomes self-supporting. Any excess of oil coming through the inlet-tube 8 will collect in the trap at the base of the vaporizing-tube instead of passing to the discharge-orifice and flooding the lamp, as sometimes occurs in other constructions. Before the oil so collecting can rise high enough to overflow the inward extension of the discharge-nozzle the oil-level will have reached a point where the greater heat of the upper portion of the tube will generate a sufficient amount of vapor to create a back pressure, which will prevent any further admission of oil until the amount so collected has been vaporized. Thus the construction illustrated forms an automatic check against the flooding of the lamp by oil.

The advantage of making the upper closed end of the tube solid, as shown in Fig. 2, is that the same is thereby prevented from being burned out, as would otherwise tend to occur if a tube or thin wall only were exposed to the intense heat of the flame center. The advantage of the construction shown in Fig. 1, employing a perforated cylinder 14, is that an added section of the vaporizing-tube is exposed to the heat of the flame and an increased effective flame area is produced. The method of supporting the mixing-tube 9 by means of the air-inlet tubes and locating the same within the mixing-chamber produces a convenient and compact arrangement and enables the heated parts of the lamp apparatus to be entirely separate from the oil-reservoir, so that there is no possibility of ignition of vapor in said reservoir. The burner parts being supported by the downwardly-extending air-inlet tubes, the latter are kept cool by the inflowing current of cold air, and consequently there is no conduction of heat whatever to the oil-reservoir. The construction shown shortens up the distance from the vapor-discharge nozzle to the burner, and thereby reduces the amount of explosive mixture contained in the lamp at any one time and also reduces the chances of condensation, while the reversal of the current of the mixture and the nature of the passage-ways through which the mixture is forced insure a thorough and homogeneous intermixing of the vapor and air. By disconnecting the oil-tube 21 the burner and vapor forming and mixing attachments may be removed from the reservoir or lamp body and supported from the table or shelf direct by the air-inlet tubes while said reservoir is being cleaned.

It is evident, of course, that various changes could be made in the details of construction illustrated without departing from the spirit and scope of my invention. In Figs. 2 and 3 the discharge-nozzle is formed in a threaded nut, which is screwed into the lower end of the vaporizing-tube and carrying the extension-tube 5. In Fig. 4 the nozzle and vaporizing-tube are all cast in one piece and the mixing-tube 9 screwed onto the lower end thereof. Still other forms of apparatus could evidently be designed which would also carry out the idea of producing an annular trap in the lower end of the vaporizing-tube for collecting the surplus oil and preventing the same from passing out to the discharge-nozzle. Other forms of perforated burner-diaphragms which would give great flame area in proximity to the vaporizing-tube might be substituted for those shown in the drawings and the shape of the mixing-tube or mixing-chambers might be varied without materially modifying the function of the apparatus.

The solid end 7 of the vaporizing-tube when hot forms a reservoir of heat, and conduction from it to the body of the tube will keep the same uniformly at a temperature that will vaporize oil. In the form shown in Fig. 4, the tube being shorter all in the flame-space, the solid end is not needed.

The main objects of the invention are twofold—to facilitate conduction of heat from the burner to all parts of the vapor forming and mixing apparatus and to prevent conduction of heat from those parts to the oil-reservoir.

Having therefore described my invention, what I claim as new, and desire to protect by Letters Patent, is—

1. The combination of a vapor-burner, an attached vaporizer and air-mixing apparatus with a series of air-inlet tubes connected to said mixer and arranged to support the burner and above-described attachments and the oil-reservoir having recesses formed on its exterior with which recesses the air-inlet tubes detachably engage and are thereby supported.

2. The combination of a vapor-burner, an attached vaporizer and air-mixing apparatus with a series of air-inlet tubes connected to said mixer and arranged to support the burner and above-described attachments and the oil-reservoir having recesses formed on its exterior with which recesses the air-inlet tubes engage and are thereby supported, together with a flexible oil-supply tube extending from said reservoir to the vaporizer.

3. The combination of the vertically-arranged vapor-burner tube having inlets near its lower end, a perforated diaphragm across its upper end, a diaphragm across said vapor-burner tube below the level of the inlets and the vertical vaporizing-tube closed at the upper end, passing through both diaphragms and arranged to discharge a jet of vapor below the level of the lower diaphragm, together with an air-supply and means for mixing the air and vapor and delivering the mixture to the inlets of the burner-tube.

4. The combination of the vertically-arranged vapor-burner tube having inlets near its lower end, a perforated diaphragm across its upper end, a diaphragm across said vapor-burner tube below the level of the inlets and the vertical vaporizing-tube closed at the upper end, passing through both diaphragms and arranged to discharge a jet of vapor below the level of the lower diaphragm, the discharge-nozzle for said vaporizing-tube having an extension up into the interior of said vaporizing-tube to form a trap in the lower portion thereof in which unvaporized oil may collect, together with an air-supply and means for mixing the air and vapor and delivering the mixture to the inlets of the burner-tube.

5. The combination of the vertically-arranged vapor-burner tube provided with air and vapor inlets, the perforated diaphragm across its upper end, the diaphragm across said vapor-burner tube below the level of the air and vapor inlets, and the vertical vaporizing-tube passing through both diaphragms, and having a discharge-nozzle in its lower end, while its upper end is closed, said discharge-nozzle having an extension up into the interior of said vaporizing-tube to form a trap in the lower portion of the vaporizing-tube in which unvaporized oil may collect, together with the oil-supply tube arranged to discharge into said trap, means for conducting air to the vapor-jet and means for conducting the mixture of air and vapor so formed to the above-described air and vapor inlets.

6. The combination of the vertically-arranged vapor-burner tube provided with air and vapor inlets, the perforated diaphragm across its upper end, the diaphragm across said vapor-burner tube below the level of the air and vapor inlets, and the vertical vaporizing-tube passing through both diaphragms, and having a nozzle in its lower end adapted to discharge below said lower diaphragm, while its upper end is closed, a portion of said upper end of the vaporizing-tube being of solid metal, means for conducting air to the vapor-jet and means for conducting the mixture of air and vapor so formed to the above-described air and vapor inlets.

7. The combination of the vertically-arranged vapor-burner tube provided with air and vapor inlets, the perforated diaphragm across its upper end, the diaphragm across said vapor-burner tube below the level of the air and vapor inlets, and the vertical vaporizing-tube passing through both diaphragms, and having a discharge-nozzle in its lower end, while its upper end is closed, together with the mixing-tube below said vaporizing-tube, the mixing-chamber closed at the bottom and having its walls joining the burner-tube at a point above the level of the air and vapor inlets thereto, and the air-inlet tubes extending through the walls of both mixing-chamber and mixing-tube.

8. The combination of the vertically-arranged vapor-burner tube, provided with air and vapor inlets, the perforated diaphragm across its upper end, the diaphragm across said vapor-burner tube below the level of the air and vapor inlets, and the vertical vaporizing-tube passing through both diaphragms, and having a discharge-nozzle in its lower end, while its upper end is closed, together with the mixing-tube below said vaporizing-tube, the mixing-chamber closed at the bottom and having its walls joining the burner-tube at a point above the level of the air and vapor inlets thereto, and the air-inlet tubes extending through the walls of both mixing-chamber and mixing-tube, and downward, the oil-reservoir having recesses in its exterior with which the downwardly-extending portions of the air-tube engage, and the flexible oil-supply tube extending from the interior of the oil-reservoir to the vaporizing-tube.

9. In a vapor-burning apparatus the combination of the burner having an annular perforated diaphragm, a central perforated cylinder mounted in said diaphragm and extending downwardly therefrom, and a vaporizing-tube extending into the space within said perforated cylinder.

10. In a vapor-burning apparatus the combination of the burner having an annular perforated diaphragm, a central perforated cylinder mounted in said diaphragm and extending downwardly therefrom, and a vaporizing-tube having one end closed and projecting into the interior of said perforated cylinder.

11. In a vapor-burning apparatus the combination of the burner having an annular perforated diaphragm, a central perforated cylinder mounted in said diaphragm and extending downwardly therefrom, and a vaporizing-tube having one end closed and projecting into the interior of said perforated cylinder, parallel to the axis of said cylinder, together with a collar mounted on said vaporizing-tube and abutting against the end of the perforated cylinder.

12. The combination of the vertically-arranged vapor-burner tube, the perforated diaphragm across the upper end, the vertical vaporizing-tube passing through said diaphragm and having a discharge-nozzle in its lower end while its upper end is closed, a mixing-tube axially alined with and forming a continuation of the vaporizing-tube and into which the nozzle discharges, a mixing-chamber within which the mixing-tube is inclosed, and air-inlet tubes extending through the walls of both mixing-chamber and mixing-tube.

Signed at New York this 27th day of June, 1900.

ARTHUR KITSON.

Witnesses:
W. H. PUMPHREY,
L. E. PEARSON.